(12) United States Patent
Faerber et al.

(10) Patent No.: US 6,392,382 B1
(45) Date of Patent: May 21, 2002

(54) COMPLIANT REMOVABLE BATTERY SUPPORT

(75) Inventors: Paul James Faerber; Grant H. Lloyd, both of Lawrenceville, GA (US); David Larmour, Westerville, OH (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/871,767

(22) Filed: Jun. 1, 2001

(51) Int. Cl.$^7$ ............................................... H01M 10/46
(52) U.S. Cl. ....................................................... 320/112
(58) Field of Search ................................ 320/110, 107, 320/106, 112, 113, 114, 115; 307/150; D13/103, 107, 108

(56) References Cited

U.S. PATENT DOCUMENTS 4,763,408 A * 8/1988 Heisey et al.
4,966,557 A * 10/1990 Barkus et al.
5,957,360 A * 9/1999 Helinski et al.
6,018,227 A   1/2000 Kumar et al.

* cited by examiner

Primary Examiner—Edward H. Tso
(74) Attorney, Agent, or Firm—Philip H. Burrus, IV

(57) ABSTRACT

This invention includes a compliant removable battery support for configuring a pocket to accommodate devices of varying size. In one preferred embodiment, a charger is provided having a pocket capable of receiving an electronic apparatus, like a cellular phone for instance. The electronic apparatus is capable of having different sized batteries attached. The pocket size is adjusted by inserting the compliant removable battery support into a guide slot that corresponds to the desired battery size. In a preferred embodiment, the compliant removable battery support has a compliant member that comprises a four bar compliance mechanism. The four bar compliant mechanism provides more robust coupling between the compliant removable battery support and the charger in that the deflection stress is distributed across the compliant mechanism.

11 Claims, 2 Drawing Sheets

COMPLIANT REMOVABLE BATTERY SUPPORT

TECHNICAL FIELD

This invention relates generally to chargers for electronic devices, and more specifically to chargers with mechanical supports for cellular telephones and batteries.

BACKGROUND

Cellular phones are becoming more and more popular. Advances in technology have made phones smaller and more affordable. In fact, as of 2000, it is not uncommon to get 1000 or more minutes of talk time per month for less than $30. Often, in order to sign customers to annual contracts, companies will actually give away cellular phones. As a result, while cellular telephones were once only used by the wealthy, they are becoming commonplace across all sectors of society.

Cellular telephones require batteries for portability. Rechargeable batteries are employed almost exclusively in cellular applications, as they can be recharged several hundred times, thereby saving battery replacement costs. The types of batteries in use differ quite considerably, however, due to the different demands of the users. For example, some people use phones only for emergencies. In this sense, they only talk on a phone for a few minutes per month. They are therefore able to get by with a small battery with limited energy storage capacity. A small, thin battery is preferred because it makes the phone smaller and lighter. Small phones are more easily carried in a pocket or purse.

Other users, like salesmen, may talk on cellular phones for many hours a day. Since they do not want to constantly recharge a battery, they might prefer a bigger, more bulky battery that has a higher energy storage capacity. Manufacturers like Motorola Inc. provide extended capacity batteries for their popular phones like the StarTac™ series. These larger, more bulky, yet higher energy batteries are often called "auxiliary" or "aux" batteries. They typically offer two to three times more capacity than do smaller, slimmer batteries.

In the end however, all of these batteries, no matter what size, must eventually be recharged. They can be charged in a number of ways. Some phone manufacturers, including Nokia and Motorola, sell power supplies that can be connected by a wire to the phone. People often prefer, however, to have a charger that can be placed on a table or desk. Companies therefore sell chargers that are designed to sit atop a desk and hold a phone while charging. The charger generally has a pocket into which the phone is inserted. Sometimes, the charger will have a second pocked for charging a spare battery.

The pockets must be capable of providing mechanical support for the phone and/or battery. In the case of a phone, the phone typically sits in an easily viewable, upright position that allows it to receive incoming calls. A problem arises in that different batteries, slim and aux for example, cause the phone to take on different shapes, or form factors. For example, when a thin, low capacity battery is connected, the phone may only be 1 inch thick. However, when an aux battery is attached, the phone may now be 2 inches thick. Likewise, the rear pocket must accommodate different from factors, as the batteries come in different sizes.

Chargers, in order to be versatile, must accommodate all the batteries that can be attached to the phone. One way to provide mechanical support is to provide a pocket large enough to accommodate a phone with the largest battery attached. Using this scheme, neither the phone nor the battery is supported by the plastic of the charger. Instead, the phone and charger have interlocking connectors. When the phone connector mates with the charger connector, the connector itself is responsible for providing the mechanical support. This scheme is illustrated in U.S. design patent No. D394423. The problem with this scheme is that the connectors are generally not robust mechanical supports. They sometimes break, rendering the charger useless.

There is therefore a need for a charger with means for supporting a phone that accommodates a variety of battery sizes.

DETAILED DESCRIPTION OF THE INVENTION

Figure 1:
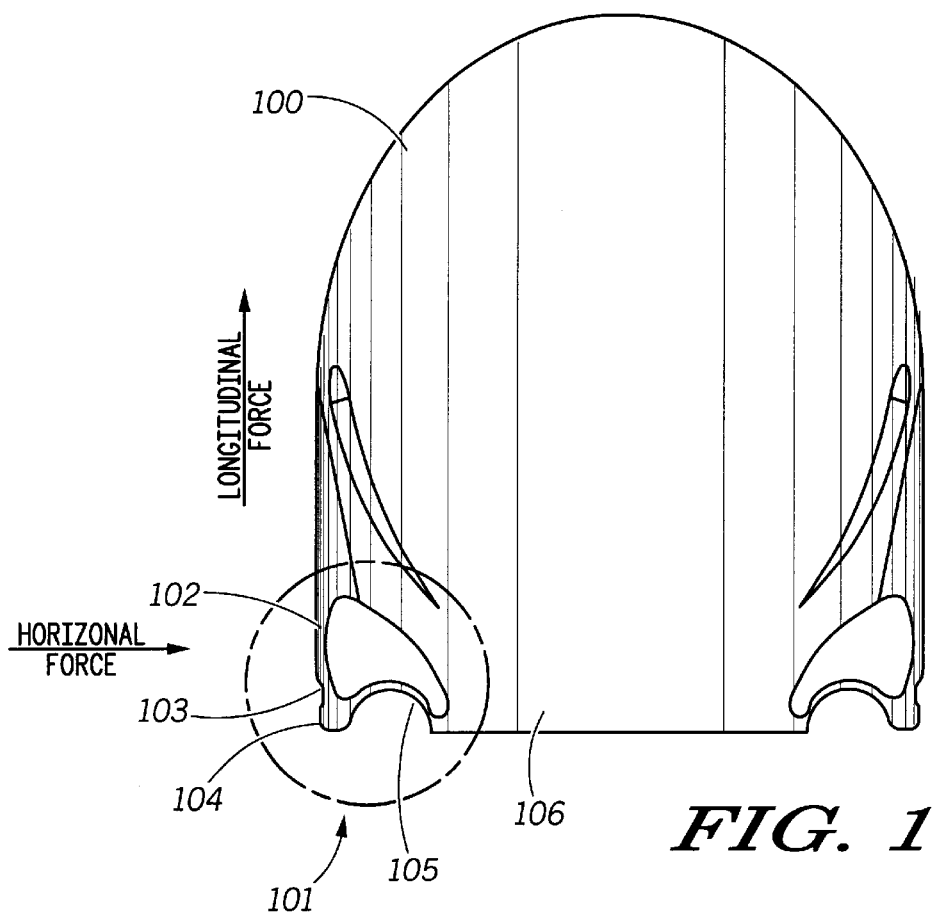
FIG. 1 is an illustration of a compliant removable battery support in accordance with the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

This invention allows a charger with at least one pocket to accommodate an electronic device having detachable batteries of various sizes. This invention also allows a charger having at least one battery-only pocket to accommodate batteries of various sizes. A charger may be provided that has several guide slots that correspond to batteries of different sizes. The invention provides a support that can be adjusted by placing the support in one of various guide slots that corresponds to the particular battery to be charged.

This invention includes a compliant removable battery support that can be used in chargers for electronic devices. Referring now to FIG. 1, illustrated therein is a preferred embodiment of such a support 100. The support includes at least one compliant retention mechanism 101. The compliant retention mechanism 101 includes a deflecting member 102, a detent recess 103, a protrusion 104, and an extensor 105. When a horizontal force is exerted upon the deflecting member, it tends to bend towards the base of the compliant removable battery support 106. The extensor 105 provides rigidity to oppose the force, as well as providing an extending force away from the base of the compliant removable battery support 106.

If the force being exerted against the deflecting member is a detent, bump or other protruding surface, the detent recess 103 is capable of mating with the detent. This mating helps hold the compliant removable battery support in place. Additionally, the protrusion 104 provides resistance to keep the detent recess 103 mated with the detent in the presence of longitudinal forces.

In one preferred embodiment, the compliant removable battery support comprises a pair of compliant retention mechanisms. The pair allows for twice the deflection of the deflecting members. The pair also allows for twice the force of the extensors in the opposite direction of the deflecting force. The net result is a compliant removable battery support that seats more securely in a charger. The compliant removable battery support is also more robust in that the greater deflection of two deflecting members reduces the chance that a deflecting member may break.

Such a compliant removable battery support can be manufactured by a number of techniques known in the art. One such example is injection molded plastic. While plastic is ideally suited for the compliant nature of the deflecting member and extensor, other materials are also suitable including metal, wood, epoxy resin, and rubber.

Figure 2:
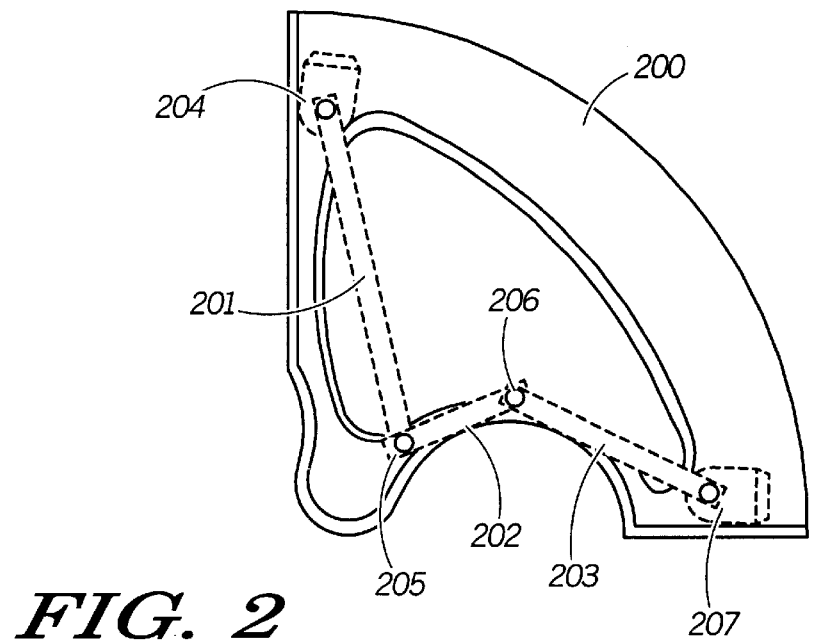
FIG. 2 is an illustration of the equivalent four-bar compliant mechanism in accordance with the invention.

The compliant retention mechanism of the compliant removable battery support is a robust invention in that it comprises a four bar compliance mechanism. Referring now to FIG. 2, illustrated therein is an equivalent four bar model of the compliant retention mechanism. The "four bars" are illustrated in a first equivalent component 200, a second equivalent component 201, a third equivalent component 202, and a fourth equivalent component 203. The first equivalent component 200 corresponds to the inner portion of the compliant removable battery support. The second equivalent component corresponds 201 to the deflecting member of FIG. 1. The third equivalent component 202 corresponds to half of the extensor, while the fourth equivalent component 203 corresponds to the other half of the extensor.

One advantage of the four bar structure of the compliance mechanism is that the bending force is distributed across four points 204, 205, 206, 207. Many compliance mechanisms known in the art, like cantilever beams for example, are constructed such that the entire deflecting stress is applied in a single point. The problem with these solutions it that when the material becomes brittle with age, they tend to break. This invention relieves the problem by providing distribution of the stress with the four bar system. The result is a compliant mechanism that is less prone to breaking.

Figure 3:
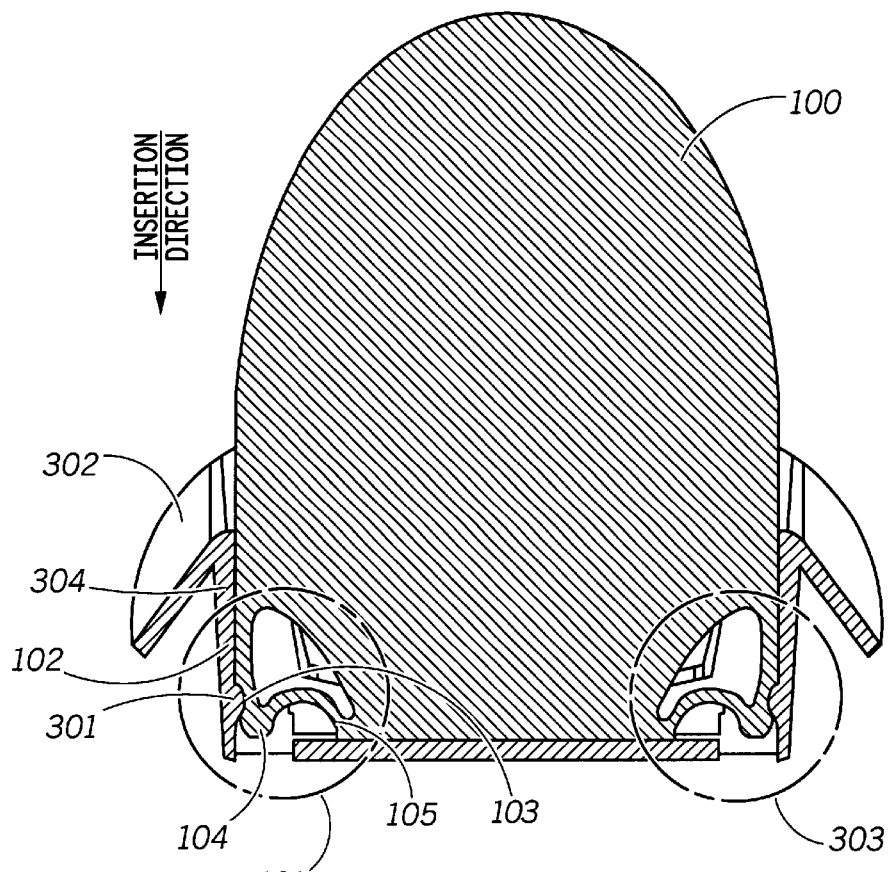
FIG. 3 is an illustration of a compliant removable battery support inserted into a charger pocket in accordance with the invention.

Referring now to FIG. 3, illustrated therein is a compliant removable battery support inserted into a housing 302 having at least one detent. In one preferred embodiment, the housing is a battery charger. For exemplary purposes, the housing 302 will hereinafter be referred to as the "charger" 302.

The charger 302 is shown in cross section. The compliant removable battery support 100 is inserted into the charger 302 along the insertion direction. The detent 301 causes the deflecting member 102 to deflect inward, thereby allowing the protrusion 104 to pass over the detent 301. Once the protrusion 104 is completely over the detent 301, the detent recess 103 then mates with the detent 301 as the extensor 105 and the deflecting member 102 each apply a force outward against the wall 304 of the charger 302. The resulting force keeps the compliant removable battery support 100 in the charger 302 vis a vis the resistance created by the protrusion 104. When the compliant removable battery support 100 is removed from the charger 302, the process occurs in reverse. In this exemplary embodiment, a second compliance member 303 is included on the opposite side of the compliant removable battery support 100, thereby providing a more robust latching mechanism.

Figure 4:
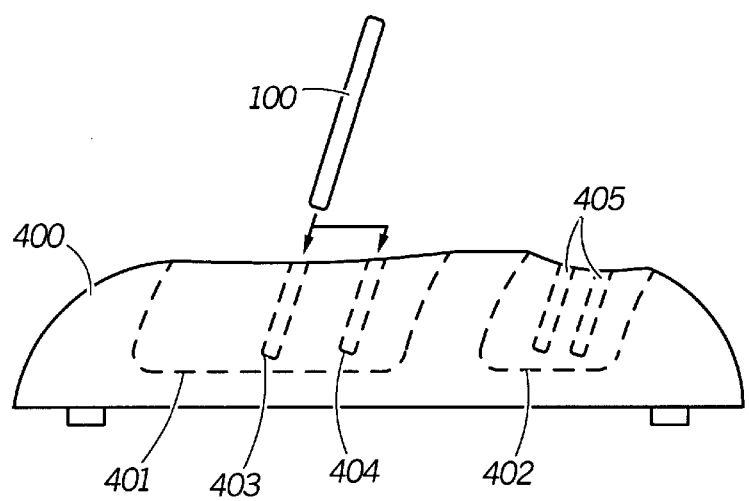
FIG. 4 is a side view of a charger having multiple guide slots for a compliant removable battery support in accordance with the invention.

Referring now to FIG. 4, illustrated therein is a charger and a compliant removable battery support 100. The charger 400 includes at least one pocket capable of receiving batteries and electronic devices on various sizes. The charger 400 may also include a spare battery pocket 402 as well.

The charger includes at least one guide slot 403 into which the compliant removable battery support 100 to slides. By sliding the compliant removable battery support 100 into any one guide slot 403, the pocket is thereby suited to hold an electronic device having a battery of a particular size. When an electronic device has a battery of another size attached, the pocket 401 is easily reconfigured by removing the compliant removable battery support 100 from the guide slot 403 and inserting it into an alternate guide slot 404. In likewise fashion, the spare battery pocket 402 can also be configured to accommodate multiple batteries by providing multiple guide slots 405 as well.

Referring again to FIG. 3, it is well to note that the detent recess 103 and detent 301 are located towards the bottom of the deflecting member 102 and the charger wall 304, respectively. This particular configuration offers multiple advantages. First, it allows the compliant removable battery support 100 to "snap" into the charger at the very last moment of insertion. Second, it allows the deflecting member 102 to be thicker at the top, where much of the bending stress is applied, and therefore less prone to breakage. Further, the injection molded tooling is simplified in that the compliant removable battery support 100, and the charger 302 as well, can be more readily removed from the mold.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while the invention has been described as being for a battery or electronic device in a charger pocket, it will be understood that the invention could be applied to other uses as well. For example, a bookrack or card file having a supporting member may be suitable for the compliant removable support as well.

What is claimed is:

1. A compliant battery support, the support comprising at least one compliant retention mechanism.

2. The support of claim 1, wherein the at least one compliant retention mechanism comprises a deflection member and an extensor.

3. The support of claim 2, wherein the at least one compliant retention mechanism further comprises a protrusion and a detent recess.

4. The support of claim 3, wherein the detent recess is disposed between the midpoint of the deflection member and the extensor.

5. The support of claim 4, wherein the support comprises two compliant retention mechanisms.

6. The support of claim 1, wherein the at least one compliant retention mechanism comprises a four bar compliance latch.

7. The support of claim 6, wherein the four bar compliance latch comprises a deflection member, a detent recess, a protrusion and an extensor.

8. A battery charger capable of receiving batteries of various sizes, the charger comprising:

a. at least one pocket;

b. at least one guide slot; and c. at least one compliant removable battery support.

9. The charger of claim 8, wherein the at least one compliant removable battery support comprises a deflection member and an extensor.

10. The charger of claim 9, wherein the at least one compliant removable battery support further comprises a detent recess and a protrusion.

11. The charger of claim 10, wherein the charger further comprises at least one spare battery pocket, the spare battery pocket comprising at least one guide slot.

* * * * *